Dec. 18, 1923.
H. A. COBAUGH
1,478,025
FABRIC BELT AND METHOD OF MAKING THE SAME
Filed Jan. 25, 1923   2 Sheets-Sheet 1
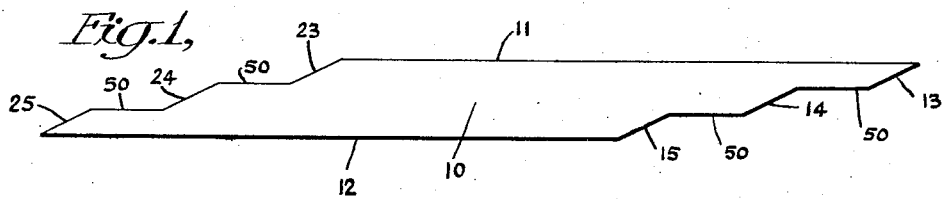
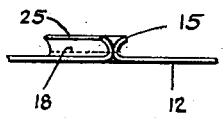
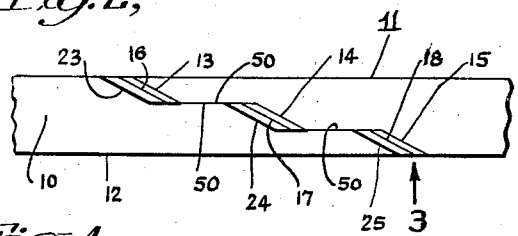
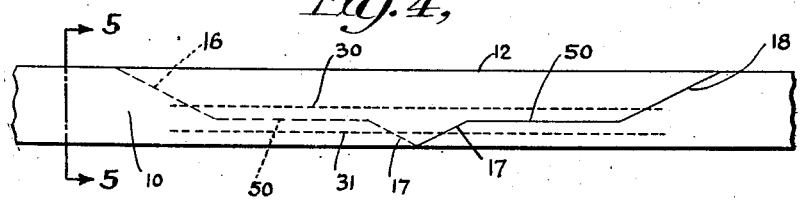
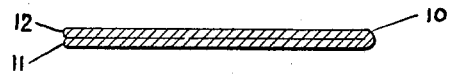
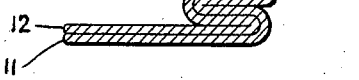
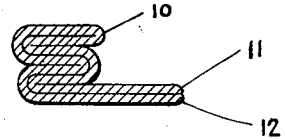
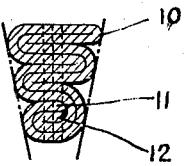
Inventor
Harry A. Cobaugh
By his Attorneys
Cooper, Kerr & Dunham Dec. 18, 1923.	1,478,025
H. A. COBAUGH
FABRIC BELT AND METHOD OF MAKING THE SAME
Filed Jan. 25, 1923   2 Sheets-Sheet 2

Inventor
Harry A. Cobaugh
By his Attorneys
Cooper, Kerr & Dunham

Patented Dec. 18, 1923.

1,478,025

UNITED STATES PATENT OFFICE.

HARRY A. COBAUGH, OF EAST ORANGE, NEW JERSEY, ASSIGNOR TO THE ROSSENDALE-REDDAWAY BELTING & HOSE CO., OF NEW YORK, N. Y., A CORPORATION OF NEW JERSEY.

FABRIC BELT AND METHOD OF MAKING THE SAME.

Application filed January 25, 1923. Serial No. 614,755.

*To all whom it may concern:*

Be it known that I, HARRY A. COBAUGH, a citizen of the United States of America, residing at East Orange, in the county of Essex and State of New Jersey, have invented certain new and useful Improvements in Fabric Belts and Methods of Making the Same, of which the following is a full, clear, and exact description.

This invention relates to driving belts and methods of making the same. More specifically it relates to endless driving belts consisting of or comprising fabric.

One of the objects of the invention is to provide an improved method of making belts of the class above referred to.

Other objects are to provide a driving belt which is strong, efficient, serviceable, of comparatively long life, and the manufacturing cost of which is comparatively low.

A further object is to provide a one-piece, fabric driving belt having longitudinally spaced diagonal splices.

A still further object is to provide an endless fabric driving belt which is V-shaped in cross-section, and the joint of which comprises longitudinally spaced diagonal splices.

An additional object is to provide a one-piece, endless, multi-ply driving belt of V-shaped cross-section. Other objects and advantages will appear as the invention is hereinafter disclosed.

Referring to the drawings which illustrate what I now consider a preferred form of the invention:

Fig. 1 is a plan view of a sheet of material from which the belt is manufactured.

Fig. 2 is a fragmentary plan view showing the sheet of fabric at a subsequent stage in the manufacture of the belt.

Fig. 3 is a fragmentary detail elevation, looking in the direction of the arrow 3 in Fig. 2, illustrating one of the diagonal seams of the belt.

Fig. 4 is a view similar to Fig. 2, but on an enlarged scale, illustrating a later stage in the manufacture.

Fig. 5 is an enlarged section taken substantially on the line 5—5 of Fig. 4.

Figs. 6, 7 and 8 are views similar to Fig. 5 but illustrating successively advanced stages in the manufacture.

Figure 9:
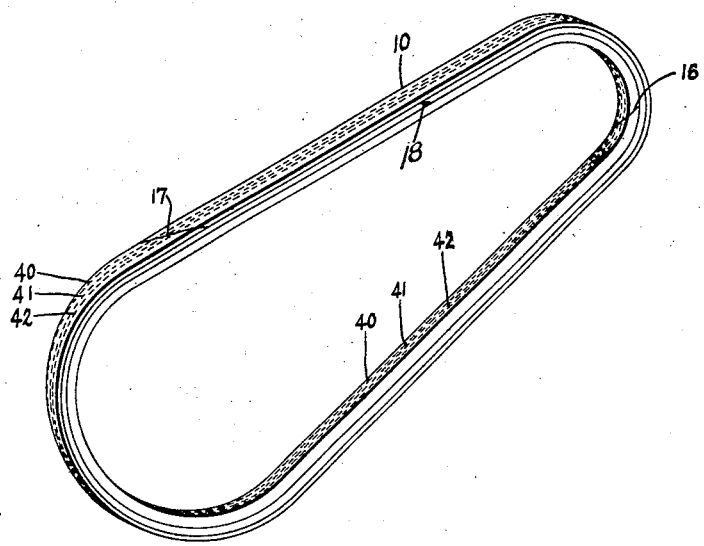
Fig. 9 is a perspective view of a finished belt.

While belts embodying features of my invention may assume other forms and be manufactured by other methods, within the scope of at least some of the appended claims, I shall now proceed to describe what I now consider a preferred method and the preferred form of belt so produced. Referring to Fig. 1, the sheet 10 of raw duck, or other suitable fabric, has two longitudinally extending selvage edges 11 and 12. As will hereinafter appear, the width of the fabric 10 will depend upon the desired width and number of plies of the finished belt. The sheet 10 is cut at opposite ends as shown in Fig. 1. It will be noted that the one of these cuts comprises diagonally extending portions 13, 14 and 15, and portions 50 which extend longitudinally of the sheet, or parallel to the selvage edges 11 and 12. The other cut similarly comprises diagonally extending portions 23, 24 and 25, and portions 50 which extend longitudinally of the sheet, or parallel to the selvage edges 11 and 12. These two cuts are complemental; i. e., when the sheet 10 is curved about an axis perpendicular to the edges 11 and 12 and parallel to the sheet 10, and the ends of the sheet brought together, the cut 13—50—14—50—15 will register throughout its length with the cut 23—50—24—50—25.

After the sheet 10 has been cut, as above described, the opposite ends are turned upwardly and then toward each other to form a hollow cylinder or band. The edges 15 and 25 are then bent upwardly (see Fig. 3) and stitched together by a line of stitching 18. The edges 15 and 25 are then ironed or otherwise flattened downwardly, away from each other, and into contact with the band 10. The edges 13—23 and 14—24 are similarly joined by stitching to form seams 16 and 17 and are similarly flattened down. The member 10 is now in the form of an endless band of fabric having selvage edges 11 and 12 and the joint will appear as shown in Fig. 2.

The band 10 is then folded transversely to place the edge 12 along the edge 11 with the flaps 13—23, 14—24 and 15—25, on the inside of the folded material. The folded band 10 now appears as shown in Figs. 4 and 5. Longitudinal stitching 30, 31 is now sewn through both folds of the band 10, the stitching 30, 31 being substantially co-extensive with cuts 50, and one of said lines of stitching 30, 31, is placed at one side of the cuts 50 and the other at the other side of said cuts. The stitching 30, 31 may be conveniently effected by means of a two-needle machine.

The two-ply band shown in Figs. 4 and 5 is then folded upon itself transversely so that all of its cross-sections will appear substantially as illustrated in Fig. 6. The band 10 now has a portion which is six-ply and these six plies may be secured together by a single longitudinal row of basting (not shown).

The band 10 is now folded transversely so that all of its cross-sections will appear substantially as illustrated in Fig. 7. The band 10 now has an eight-ply portion and these eight plies may be secured together by a single longitudinal row of basting (not shown).

The selvage edge 11—12 is now turned under and upon itself so that all cross-sections of the band 10 will appear substantially as shown in Fig. 8. During the operation last described the permanent sewing is effected by sewing three (or more, if desired) longitudinal rows of stitching 40, 41, 42 through the entire twelve plies of the band shown in Fig. 8. For this stitching, a high-grade shoe twine is preferably employed. The finished belt now appears substantially as shown in Figs. 8 and 9.

It will be noted that the belt illustrated is a V-shaped one (see Fig. 8) in cross-section. This is effected by making the inner folds of the belt narrower than the outer ones as shown in Figs. 6 to 8. This particular belt is adapted to operate efficiently with grooved pulleys.

It will further be noted that the belt shown in Figs. 8 and 9 is a one-piece belt in that it consists of a single piece of fabric. It may however be modified without departing from the scope of certain of the claims. For example, the belt may be made in two pieces by slitting it along the longitudinal crease shown at the right-hand end of Fig. 5. Other modifications in structure and method of manufacture may also be resorted to without departing from the scope of the invention as defined in at least some of the appended claims. If desired, the belt may be impregnated or treated with any desired compound or liquid at any stage of its manufacture.

While the preferred method of making the belt and the construction and advantages of the preferred form of belt so produced will be apparent to those skilled in the art, in view of the foregoing disclosure, I wish to call particular attention to the relative location of the diagonal splices or seams 16, 17 and 18. Calling attention to Fig. 1, it will be noted that angle or diagonal cuts 13, 14 and 15 are not continuous but are longitudinally spaced by the longitudinal cuts 50. The angle or diagonal cuts 23, 24 and 25 are similarly spaced by the longitudinal cuts 50. When the band 10 is spliced, as shown in Fig. 2, the splices or seams 16, 17 and 18 are longitudinally spaced by the joints 50. Therefore, in the finished belt (Fig. 9) the diagonal seams or splices 16, 17 and 18 are longitudinally spaced with considerable longitudinal distances between them. By virtue of this construction the finished belt 10 is more nearly of uniform cross-section and much stronger than is the case when the splices are closely adjacent each other.

What I claim is:—

1. An endless driving belt comprising a plurality of integrally connected plies of fabric joined at their ends, the joint of said fabric having portions extending diagonally with respect to the length of the belt and a portion extending longitudinally of the belt.

2. An endless driving belt comprising a plurality of integrally connected plies of fabric joined at their ends, the joint of said fabric having portions extending diagonally with respect to the length of the belt and a portion extending longitudinally of the belt, and substantially parallel to the edges of the belt.

3. An endless driving belt comprising a plurality of integrally connected plies of fabric joined at their ends, the joint of said fabric having portions extending diagonally with respect to the length of the belt and portions extending longitudinally of the belt, and substantially parallel to the edges of the belt, said last named portions being alternately arranged with respect to said diagonally extending portions.

4. A one-piece, multi-ply, fabric driving belt having a joint comprising a plurality of longitudinally spaced diagonal splices.

5. A one-piece, multi-ply, fabric driving belt having a joint comprising a plurality of longitudinally spaced diagonal splices, and longitudinal stitching joining the plies to each other.

6. A one-piece, multi-ply, fabric driving belt having a joint comprising a plurality of longitudinally spaced diagonal seams.

7. A one-piece, multi-ply, fabric driving belt having a joint comprising a plurality of longitudinally spaced diagonal seams, and longitudinal stitching joining the plies to each other.

8. A V-shaped one-piece, multi-ply, fabric driving belt having a joint comprising a plurality of longitudinally spaced diagonal seams.

9. A V-shaped one-piece, multi-ply, fabric driving belt having a joint comprising a plurality of longitudinally spaced diagonal seams, and longitudinal stitching joining the plies to each other.

10. An endless driving belt comprising a plurality of integrally connected plies of fabric joined at their ends, the joint of said fabric comprising a plurality of longitudinally spaced diagonal splices.

11. The method of making a driving belt which comprises cutting the opposite ends of a sheet of fabric to form a plurality of longitudinally spaced diagonal joints which register when the ends of the sheet are placed together, placing the ends of the sheet together, folding the sheet transversely, and stitching the folds together.

12. The method of making a driving belt which comprises cutting the opposite ends of a sheet of fabric to form a plurality of longitudinally spaced diagonal joints which register when the ends of the sheet are placed together, placing the ends of the sheet together, stitching the registering portions of each of said joints, folding the sheet transversely, and stitching the folds together.

13. The method of making a driving belt which comprises cutting the opposite ends of a sheet of fabric to form a plurality of diagonal joints and interposed longitudinal joints which register when the ends of the sheet are placed together, placing the ends of the sheet together, stitching the registering portions of each of said diagonal joints, folding the sheet transversely, stitching the folded sheet on both sides of each of said longitudinal joints, folding the sheet transversely, and stitching the folds together.

14. A one-piece endless, multi-ply fabric driving belt of V-shaped cross-section.

15. An endless, multi-ply fabric driving belt of V-shaped cross-section, and having a joint comprising longitudinally spaced diagonal splices.

16. A one-piece endless, multi-ply fabric driving belt of V-shaped cross-section, and having a joint comprising longitudinally spaced splices.

In testimony whereof I hereunto affix my signature.

HARRY A. COBAUGH.